(12) United States Patent
Zigante et al.

(10) Patent No.: US 10,543,629 B2
(45) Date of Patent: Jan. 28, 2020

(54) METHOD AND APPARATUS FOR INJECTION MOLDING OF PLASTIC MATERIALS

(71) Applicant: INGLASS S.p.A., San Polo di Piave (IT)

(72) Inventors: Andrea Zigante, San Polo di Piave (IT); Claudio Dall'acqua, San Polo di Piave (IT)

(73) Assignee: INGLASS S.p.A., San Polo di Piave (Treviso) (IT)

( * ) Notice: Subject to any disclaimer, the term of this patent is extended or adjusted under 35 U.S.C. 154(b) by 601 days.

(21) Appl. No.: 14/963,874

(22) Filed: Dec. 9, 2015

(65) Prior Publication Data
US 2016/0167272 A1   Jun. 16, 2016

(30) Foreign Application Priority Data
Dec. 11, 2014   (IT) .......................... TO2014A001030

(51) Int. Cl.
*B29C 45/28* (2006.01)
*B29C 45/00* (2006.01)

(52) U.S. Cl.
CPC .............................. *B29C 45/0025* (2013.01)

(58) Field of Classification Search
CPC ... B29C 45/231; B29C 45/76; B29C 45/0025; B29C 45/18; B29C 45/281; B29C 2045/2872; B29C 28/24; B29C 28/1792
See application file for complete search history.

(56) References Cited

U.S. PATENT DOCUMENTS

| | | | |
|---|---|---|---|
| 5,556,582 A | 9/1996 | Kazmer et al. | |
| 6,228,309 B1 | 5/2001 | Jones et al. | |
| 7,588,436 B2 * | 9/2009 | Tooman | B29C 45/281 425/146 |
| 9,005,509 B2 | 4/2015 | Galati et al. | |
| 9,011,736 B2 | 4/2015 | Antunes et al. | |

(Continued)

FOREIGN PATENT DOCUMENTS

| | | |
|---|---|---|
| CN | 103068551 A | 4/2013 |
| CN | 104718059 A | 6/2015 |

(Continued)

OTHER PUBLICATIONS

Kazmer, D. and Barkan, P. (1997), Multi-cavity pressure control in the filling and packing stages of the injection molding process. Polym Eng Sci, 37: 1865-1879. doi:10.1002/pen.11837 (Year: 1997).*

(Continued)

*Primary Examiner* — Galen H Hauth
(74) *Attorney, Agent, or Firm* — RMCK Law Group PLC (57) ABSTRACT

A method for injection molding of plastic materials into a cavity of a mold by means of a molding apparatus including at least one injector having a pin valve displaceable between a fully closed position and a maximum opening position, and vice versa, in a controlled fashion in respect of its position and speed. In the opening displacement from the fully closed position to the maximum opening position, the pin valve is initially moved at a first speed and subsequently at a second speed, where the first speed is the highest opening displacement speed of the pin valve.

19 Claims, 5 Drawing Sheets

(56) References Cited

U.S. PATENT DOCUMENTS

| | | | |
|---|---|---|---|
| 9,144,929 B2 | 9/2015 | Tan et al. |
| 9,205,587 B2 | 12/2015 | Antunes et al. |
| 9,427,905 B2 | 8/2016 | Tan et al. |
| 9,440,389 B2 | 9/2016 | Galati et al. |
| 9,492,960 B2 | 11/2016 | Galati et al. |
| 9,498,909 B2 | 11/2016 | Moss et al. |
| 9,604,399 B2 | 3/2017 | Yang et al. |
| 9,623,598 B2 | 4/2017 | Galati et al. |
| 9,636,858 B2 | 5/2017 | Antunes et al. |
| 9,662,820 B2 | 5/2017 | Antunes et al. |
| 9,682,504 B2 | 6/2017 | Tan et al. |
| 9,682,507 B2 | 6/2017 | Schreyer et al. |
| 9,724,861 B2 | 8/2017 | Antunes et al. |
| 9,738,016 B2 | 8/2017 | Bazzo et al. |
| 9,738,024 B2 | 8/2017 | Antunes et al. |
| 9,873,219 B2 | 1/2018 | Galati et al. |
| 9,878,477 B2 | 1/2018 | Moss et al. |
| 9,908,273 B2 | 3/2018 | Antunes et al. |
| 9,919,462 B2 | 3/2018 | Bazzo et al. |
| 9,937,648 B2 | 4/2018 | Galati et al. |
| 9,944,006 B2 | 4/2018 | Tan |
| 9,981,414 B2 | 5/2018 | Bazzo et al. |
| 9,987,783 B2 | 6/2018 | Tan et al. |
| 9,993,953 B2 | 6/2018 | Lee et al. |
| 10,005,215 B2 | 6/2018 | Tan et al. |
| 10,005,216 B2 | 6/2018 | Tan et al. |
| 10,046,496 B2 | 8/2018 | Tan et al. |
| 10,046,497 B2 | 8/2018 | Tan et al. |
| 10,052,801 B2 | 8/2018 | Galati et al. |
| 2004/0262813 A1* | 12/2004 | Pierick | B29C 44/3442 264/328.1 |
| 2008/0014296 A1 | 1/2008 | Tooman et al. |
| 2014/0210119 A1 | 7/2014 | Galati et al. |
| 2016/0229102 A1 | 8/2016 | Galati |
| 2016/0325474 A1 | 11/2016 | Tan et al. |
| 2017/0100869 A1 | 4/2017 | Tan et al. |
| 2017/0151701 A1 | 6/2017 | Lee et al. |
| 2017/0151703 A1 | 6/2017 | Antunes et al. |
| 2017/0165890 A1 | 6/2017 | Yang et al. |
| 2017/0173836 A1 | 6/2017 | Galati et al. |
| 2017/0190090 A1 | 7/2017 | Antunes et al. |
| 2017/0210048 A1 | 7/2017 | Antunes et al. |
| 2017/0246784 A1 | 8/2017 | Tan et al. |
| 2017/0305050 A1 | 10/2017 | Antunes et al. |
| 2017/0305052 A1 | 10/2017 | Antunes et al. |
| 2017/0326766 A1 | 11/2017 | Tan |
| 2017/0341283 A1 | 11/2017 | Tan et al. |
| 2018/0015652 A1 | 1/2018 | Galati |
| 2018/0079121 A1 | 3/2018 | Lee et al. |
| 2018/0093403 A1 | 4/2018 | Lee |
| 2018/0111299 A1 | 4/2018 | Moss et al. |
| 2018/0111300 A1 | 4/2018 | Galati et al. |
| 2018/0194050 A1 | 7/2018 | Galati |
| 2018/0257283 A1 | 9/2018 | Tan et al. |
| 2018/0257284 A1 | 9/2018 | Tan et al. |
| 2018/0326634 A1 | 11/2018 | Tan et al. |
| 2018/0339442 A1 | 11/2018 | Tan et al. |
| 2018/0339443 A1 | 11/2018 | Antunes et al. |

FOREIGN PATENT DOCUMENTS

| | | |
|---|---|---|
| CN | 105121121 A | 12/2015 |
| CN | 105283296 A | 1/2016 |
| CN | 105451959 A | 3/2016 |
| CN | 105612039 A | 5/2016 |
| CN | 104526975 B | 11/2016 |
| CN | 104718059 B | 2/2017 |
| CN | 105050791 B | 2/2017 |
| CN | 106738673 A | 5/2017 |
| CN | 105121121 B | 9/2017 |
| CN | 105283296 B | 10/2017 |
| CN | 107428055 A | 12/2017 |
| CN | 107530933 A | 1/2018 |
| CN | 105451959 B | 2/2018 |
| CN | 107750202 A | 3/2018 |
| CN | 105612039 B | 5/2018 |
| CN | 106103036 B | 7/2018 |
| CN | 108527781 A | 9/2018 |
| EP | 2504145 B1 | 6/2013 |
| EP | 2604408 B1 | 6/2013 |
| EP | 2620266 A1 | 7/2013 |
| EP | 2620266 B1 | 7/2013 |
| EP | 2604408 B1 | 3/2014 |
| EP | 2620266 B1 | 3/2015 |
| EP | 2882581 A1 | 6/2015 |
| EP | 2888091 B1 | 7/2015 |
| EP | 2925503 A1 | 10/2015 |
| EP | 2976203 A1 | 1/2016 |
| EP | 2744636 B1 | 2/2016 |
| EP | 3003680 A1 | 4/2016 |
| EP | 3003681 A1 | 4/2016 |
| EP | 3062985 A1 | 9/2016 |
| EP | 2925503 B1 | 1/2017 |
| EP | 2931491 B1 | 2/2017 |
| EP | 3180176 A1 | 6/2017 |
| EP | 3195998 A1 | 7/2017 |
| EP | 3240666 A1 | 11/2017 |
| EP | 3247545 A1 | 11/2017 |
| EP | 3247546 A1 | 11/2017 |
| EP | 3013549 B1 | 12/2017 |
| EP | 3271129 A1 | 1/2018 |
| EP | 3271130 A1 | 1/2018 |
| EP | 3291957 A1 | 3/2018 |
| EP | 3299140 A1 | 3/2018 |
| EP | 3003680 B1 | 4/2018 |
| EP | 3003681 B1 | 4/2018 |
| EP | 3019323 B1 | 4/2018 |
| EP | 2961586 B1 | 5/2018 |
| EP | 3326777 A1 | 5/2018 |
| EP | 2986432 B1 | 6/2018 |
| EP | 3148767 B1 | 6/2018 |
| EP | 2888091 B1 | 7/2018 |
| EP | 3342575 A1 | 7/2018 |
| EP | 3357664 A1 | 8/2018 |
| EP | 3271129 B1 | 9/2018 |
| EP | 3385052 A1 | 10/2018 |
| EP | 3386711 A1 | 10/2018 |
| EP | 3180176 B1 | 12/2018 |
| EP | 3412425 A1 | 12/2018 |
| JP | 5615975 B2 | 10/2013 |
| JP | 2013539426 A | 10/2013 |
| JP | 5615975 B2 | 9/2014 |
| JP | 5621047 B2 | 11/2014 |
| KR | 1020140074991 A | 6/2014 |
| WO | 2012074879 A1 | 6/2012 |
| WO | 2012087491 A1 | 6/2012 |
| WO | 2013/053664 A1 | 4/2013 |
| WO | 2014025368 A1 | 2/2014 |
| WO | 2014025369 A2 | 2/2014 |
| WO | 2014031826 A2 | 2/2014 |
| WO | 2014025369 A3 | 4/2014 |
| WO | 2014085321 A1 | 6/2014 |
| WO | 2014093849 A2 | 6/2014 |
| WO | 2014031826 A3 | 9/2014 |
| WO | 2014134376 A1 | 9/2014 |
| WO | 2014153330 A1 | 9/2014 |
| WO | 2014172100 A1 | 10/2014 |
| WO | 2014153330 A9 | 11/2014 |
| WO | 2014193829 A1 | 12/2014 |
| WO | 2014194037 A1 | 12/2014 |
| WO | 2014209857 A1 | 12/2014 |
| WO | 2015006261 A1 | 1/2015 |
| WO | 2015066004 A1 | 5/2015 |
| WO | 2015183332 A1 | 12/2015 |
| WO | 2016053478 A1 | 4/2016 |
| WO | 2016153608 A1 | 9/2016 |
| WO | 2016153632 A1 | 9/2016 |
| WO | 2016153703 A1 | 9/2016 |
| WO | 2016153704 A1 | 9/2016 |
| WO | 2016153705 A1 | 9/2016 |
| WO | 2017027192 A1 | 2/2017 |

(56) References Cited

FOREIGN PATENT DOCUMENTS

| WO | 2017100445 A1 | 6/2017 |
| WO | 2017100575 A1 | 6/2017 |
| WO | 2018089243 A1 | 5/2018 |

OTHER PUBLICATIONS

"The new FLEXflow Accurate, stable and easy-to-use Servo-Driven valve gate for top quality. What You Have Always Dreamed of Only Better", Oct. 9, 2014 (Oct. 9, 2014), XP055205110, www.hrsflow.com Retreieved from the Internet: URL:http://www.hrsflow.com/DownLoadFileUrl.php? url=backend@@download@@file_upload@@allegato@@141009112811_1_flexflow_flyer_eng.pdf &nomefile=1_flexflow_flyer_flyer_eng.pdf [retrieved on Jul. 28, 2015] pp. 2-5.

Italian Search Report and Written Opinion for Italian Application No. ITTO20141030 dated Aug. 25, 2015, 7 pages.

Kazmer, D. et al: "Multi-Cavity Pressure Control in the Filling and Packing Stages of the Injection Molding Pocess", Polymer Engineering and Science, Brookfield Center, US, vol. 37, No. 11, Nov. 1, 1997 (Nov. 1, 1997), pp. 1865-1879, XP000776243, ISSN: 0032-3888, DOI: 10.1002/PEN.11837.

Korean Office Action dated Sep. 12, 2018 (9 pages).
Korean Office Action dated Aug. 1, 2019. 12 pages.

* cited by examiner

METHOD AND APPARATUS FOR INJECTION MOLDING OF PLASTIC MATERIALS

CROSS REFERENCE TO RELATED APPLICATIONS

This application claims priority to Italian Patent Application No. TO2014A001030 filed on Dec. 11, 2014, the entire disclosure of which is incorporated herein by reference.

FIELD OF THE INVENTION

The present invention refers to the injection molding of plastic materials and more in particular it regards a method for injection molding by means of an apparatus comprising a distributor of fluid plastic material under pressure connected to at least one injector including a pin valve displaceable between a fully closed position and a maximum opening position and vice versa.

Typically, these injection molding methods comprise a step for filling the mold cavity with the plastic material following the displacement of the pin valve from the closed position to the maximum opening position, followed by a step of packing the plastic material injected under pressure into the cavity, in which the pin valve is held in the maximum opening position. The pin valve is then displaced from the maximum opening position to the fully closed position and the molded detail is removed from the mold after a waiting period to allow the plastic material to solidify.

The displacements of the pin valve or each injector are conventionally carried out through a fluid actuator. Apparatus in which the pin valve is operated by a rotary electric actuator, in a controlled fashion through electronic systems, have been proposed over the recent times.

STATE OF THE PRIOR ART

The use of electrical actuators for operating the pin valve of the or of each injector of the molding apparatus is for example described in documents JP-06114887, U.S. Pat. No. 7,121,820 and EP-2679374 (on behalf of the Applicant). The electrical actuators, compared with the fluid actuators, are much easier to control utilizing electronic systems which operate according to process parameters, detected through special sensors and/or through specific algorithms. This allows efficiently controlling the position of the pin valve between the closed position and the opening position to vary the flow of the plastic material injected during the molding cycle, for example as described in U.S. Pat. No. 6,294,122 as well as the displacement speed of the pin valve during the displacement movement thereof from the closed position to the opening position. Thus, documents WO-2012/074879 and WO-2012/087491 provide for controlling the electrical actuator to displace the pin valve in a continuous fashion from the closed position to the opening position initially at an initial speed and then at one or more speeds higher than the initial speed. Such control is carried out as a function of time or the space covered by the pin valve starting from the closed position thereof.

This type of control is difficult to correlate with the actual process conditions, i.e. a series of considerably variable parameters for example as a function of variation of the operating conditions and the physical state of the plastic material as well as the pressure of the plastic material supplied to the injector.

In particular, the injection pressure in the distributor is maximum in the moments preceding the opening of the pin valve and thus the injection gate of the mold. In these conditions, a considerable displacement opening of the pin valve may create surface defects on the molded piece in proximity of the gate due to the rapid and concentrated discharge of the injection pressure. These aesthetic defects, corresponding to the flow lines of the injected plastic material, may be evident and unacceptable at times.

Other considerable aesthetic effects may arise, at the end of the pin valve closing step, due to possible seepage of the plastic material towards to gate.

A more accurate control is thus particularly desirable for the injection molding of details that require high quality both from a mechanical and aesthetic point of view.

SUMMARY OF THE INVENTION

The object of the present invention is to provide an efficient solution to the aforementioned technical problem, through a control of the injection process capable of allowing limiting or entirely eliminating the aforementioned defects from the molded pieces, by acting on the position and speed of the pin valve of the or of each molding apparatus injector through a new and innovative control of the relative electrical actuator in the entire opening and closing cycle.

With the aim of attaining this object, the invention aims at providing an injection molding method of the type defined in the introduction, in which the opening displacement from the fully closed position to the maximum opening position the pin valve is initially moved at a first speed and subsequently at a second speed, whose main characteristic lies in the fact that said first speed is higher than said at least one second speed.

Thanks to this solution idea, a partial vacuum of the molding apparatus distributor occurs at the start of the injection cycle, due to which the surface quality of the molded pieces may be improved considerably.

The first speed is conveniently the highest opening displacement speed of the pin valve, which is moved at such first speed from the fully closed position up to a partial opening position. In this partial opening position, the pin valve is temporarily stopped for a determined time, thus displacement thereof towards the maximum open position is non-continuous.

According to another aspect, the method according to the invention is further characterized in that the pin valve is displaced from the maximum opening position towards the fully closed position temporarily stopping for an established period of time in a partial closing intermediate position, thus also the displacement thereof towards the fully closed position is non-continuous.

Another distinctive characteristic of the invention lies in the fact that at the end of said determined stop time in the partial closing intermediate position, a torque, which is predetermined as a function of process parameters, is applied to the electrical actuator so as to displace the pin valve from the intermediate partially closed position to the fully closed position.

This characteristic allows obtaining, at the end of the injection cycle, a "forced closing" of the gate which allows guaranteeing the absence of seepage of plastic material and thus further advantageous effects in terms of improved aesthetic quality of the molded pieces.

The invention also regards an apparatus for implementing the injection molding method.

BRIEF DESCRIPTION OF THE FIGURES

The invention will now be described in detail, purely by way of non-limiting example, with reference to the attached drawings, wherein.

DETAILED DESCRIPTION OF THE INVENTION

Figure 1:
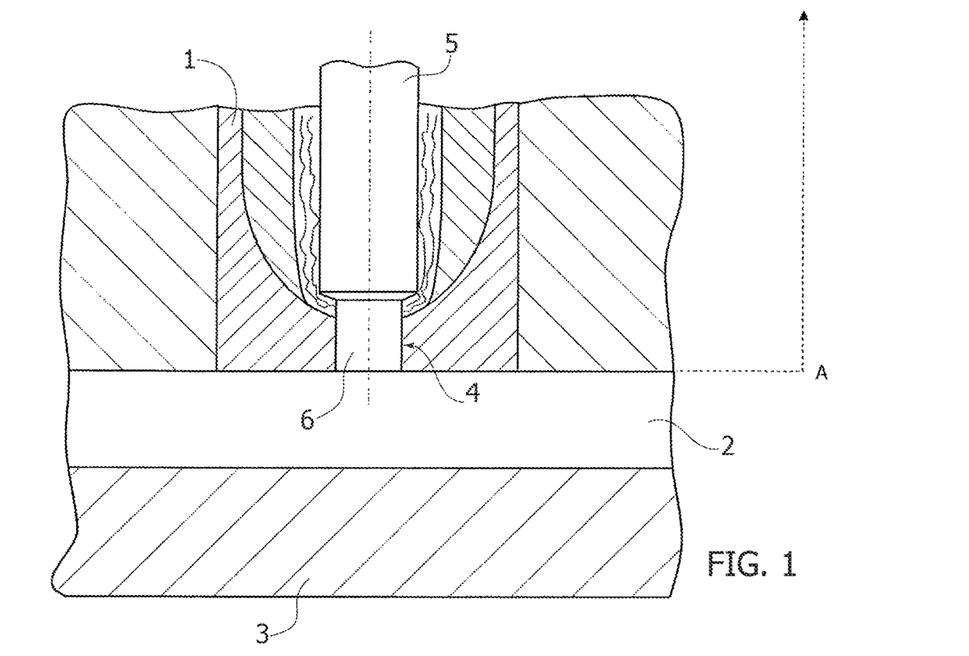
FIG. 1 is partial schematic and axial sectional view showing a part of an injection molding apparatus represented in a first step of the method according to the invention.
Figure 5:
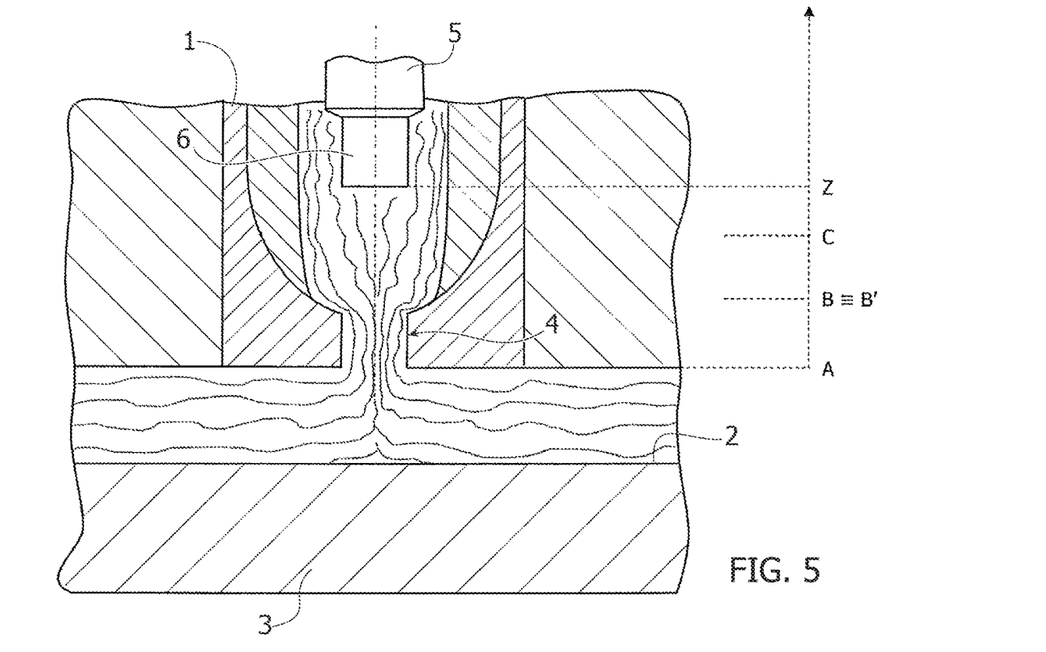

FIG. 1 schematically shows a part of the apparatus for injection molding of plastic materials, in a generally conventional manner and as described in the previously mentioned document EP-2679374 on behalf of the Applicant, an element for distributing the molten plastic material or hot chamber which supplies the plastic material to one or more injectors each comprising a nozzle generally indicated with 1 in communication with the cavity 2 of a mold 3 through an injection gate 4. The flow of the plastic material through the gate 4 is controlled by a pin valve 5 which can be axially displaced along the nozzle 1 through an actuator (not illustrated) between a fully closed advanced position represented in FIG. 1 and a maximum opening receded position illustrated in FIG. 5.

The pin valve 5 is capable of accurately varying the flow rate of the plastic material which traverses the gate and enters into the cavity 2 of the mold 3 between a null value (fully closed position) and a maximum value (maximum opening position), and vice versa.

In the case of the illustrated example, the tip of the pin valve 5 cooperating with the gate 4, indicated with 6, is cylindrical-shaped: alternatively, it could be frusto-conical shaped.

The actuator which controls the displacements of the pin valve 5 is an electrical actuator, and a rotary electric motor more in particular. It is not represented for the sake of illustration simplicity and it is for example of the type described and illustrated in the aforementioned document EP-2679374 on behalf of the Applicant, in which the shaft of the rotary electric motor drives the pin valve 5 through a transmission including a screw and nut group as well as an oscillating lever.

The electric motor is in turn operatively connected to a programmable electronic control unit and configured to drive the pin valve 5 in a controlled fashion according to its position and its displacement speed. The control may be carried out as a function of operative parameters of the molding apparatus, such as for example the pressure of the plastic material injected into the cavity 2 of the mold 3, and/or preset parameters.

Following is a description of the opening cycle (upstream) and closing cycle (downstream) of the pin valve 5 carried out according to the method according to the invention, which allows guaranteeing an optimal surface quality of the molded piece.

Filling Step

The injection pressure in the nozzle 1 is maximum in the moments preceding the opening of the gate 4. In these conditions, a considerable displacement opening of the pin valve 5 may create surface defects on the molded piece in proximity of the gate 4, due to the rapid and concentrated discharge of the injection pressure. In particular, the flow lines of the injected material are observable on the molded piece in this case.

Figure 2:
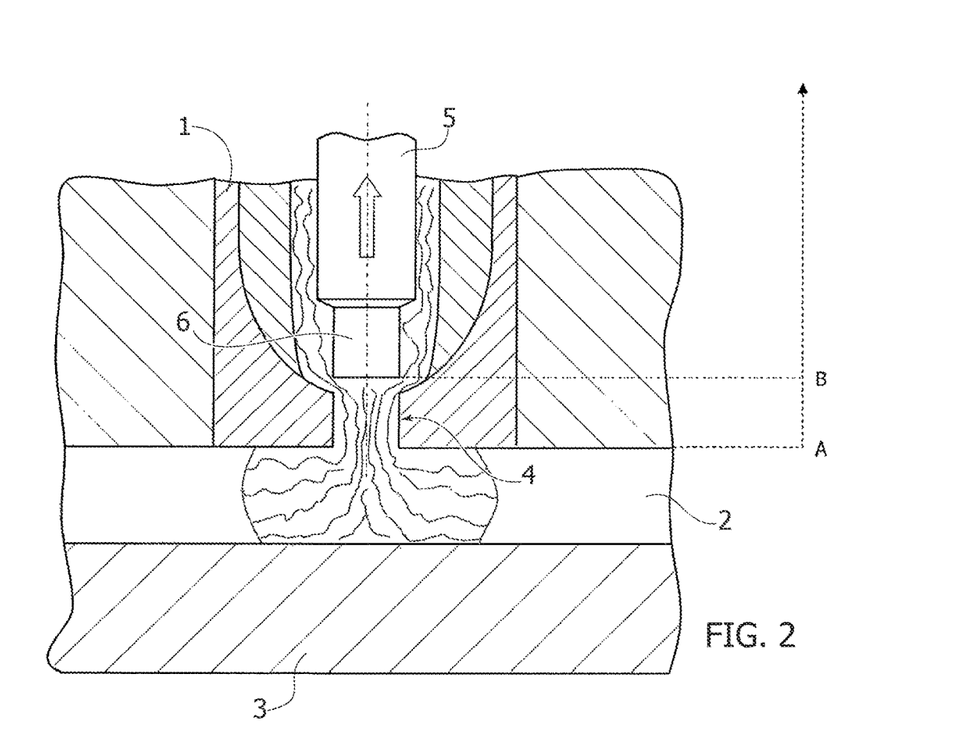
FIGS. 2 to 8 are views similar to FIG. 1 showing further steps of the method according to the invention.
Figure 3:
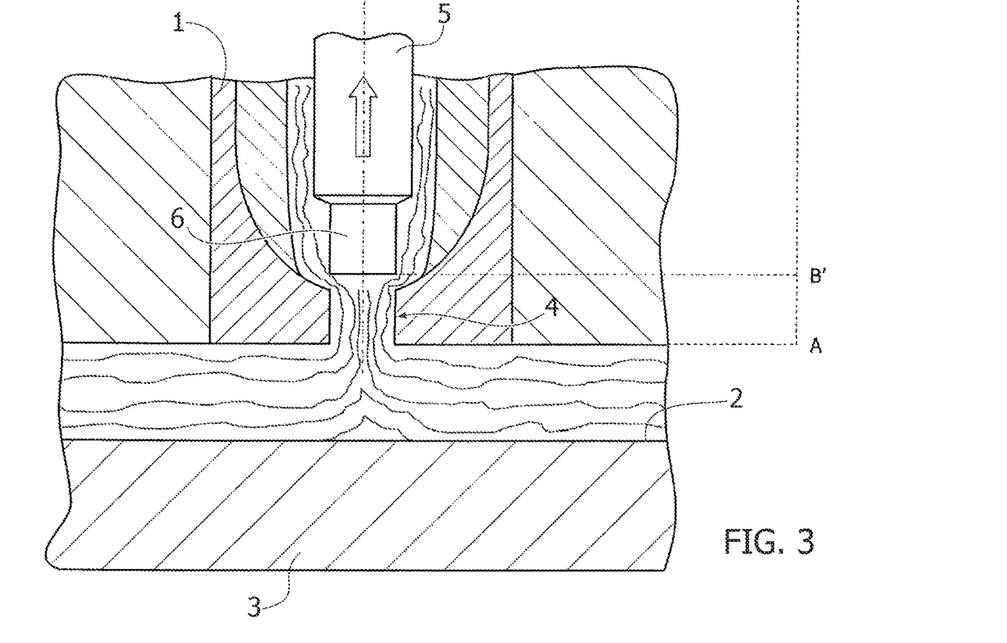
Figure 4:
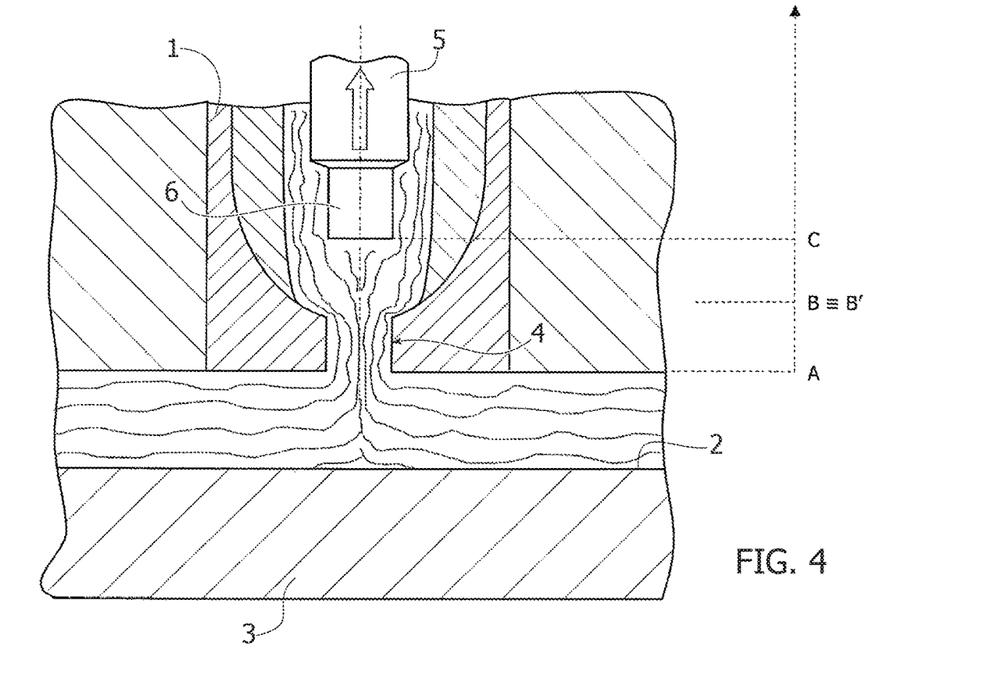

The concept on which the present invention is based is to limit or entirely eliminate this type of defects, by acting on the accurate control of position and speed of the pin valve 5 through the electrical actuator and the relative electronic control unit. In particular, the invention provides for performing an initial partial decompression of the nozzle 1 and the distributor or hot chamber of the molding apparatus, through the following distinctive methods:

- with reference to FIG. 1, the pin valve 5 initially has its tip 6 (cylindrical or frusto-conical shaped as mentioned) in the fully closed position A of the gate 4. The injection pressure in the hot chamber and acting in the nozzle 1 of the injector is maximum;
- the pin valve 5 is initially moved at a maximum speed from among the speeds observable over the entire opening step up to a first position B of partially opening the gate 4, suitably set in the electronic control unit. The position B is such that a minimum gap is left for the material to flow outside the gate 4 and start filling the mold cavity (FIG. 2). However, such minimum gap should not degrade the material;
- position B is thus held while the flow material fills the cavity 2 of the mold to a point such to be able to correctly read the injection pressure by means of special sensors. Pressure measurement may be carried out using sensors placed in the cavity, or indirectly by reading the torque of the electric motor, as described in the Italian patent application n° TO2014A000701 on behalf of the Applicant, not published as of date of filing of the present application. The pin valve 5 is held stationary in B until the injection pressure reaches a determined value in the electronic control unit (point B', FIG. 3). Thus, the high initial pressure is discharged in a controlled and not sudden fashion, limiting or eliminating the corresponding surface defects of the molded piece, in proximity of the gate 4.
- Alternatively, position B is held for a preset period of time in the electronic control unit, for example obtained as a result of a dynamic process simulation or subsequent attempts during the step of starting the molding apparatus, evaluating the surface obtained each time;
- upon reaching the desired pressure, or the end of the preset period of time, the pin valve 5 is further moved upstream up to the partial opening position C, according to a generic optimal cycle for filling the programmed piece in the electronic control unit (FIG. 4). The opening speed from B' and C is however always lower than the initial section A-B;
- the pin valve 5 is further moved upstream up to the maximum opening position Z (FIG. 5), not necessarily coinciding with the top dead centre of the pin valve stroke (100%). The opening speed of the section C-Z may be indistinctively higher, lower or equal (constant speed) with respect to the preceding section B'-C, depending on the optimal cycle set in the electronic control unit. In any case, it will always be lower than the initial section A-B.

Further positions D, E, F etc., identifying corresponding sections C-D, D-E etc. may be possibly provided for between position C and position Z. The speed profile outlined between B' and Z through the single sections B'-C, C-D, D-E, E-F, etc., may be variously shaped, as a function of the optimal cycle programmed in the electronic control unit (not necessarily constant or monotone increasing speed). The speed of each single section comprised between B' and Z shall definitely always be lower than that of the first section A-B.

upon reaching the maximum opening position Z, the cycle continues with the step of packing the plastic material in the cavity 2 of the mold 3. The position Z may possibly be held fixed (null speed) for a determined period of time between the end of the filling step and the start of the packing step.

Packing Step

During the packing step, the torque applied by the electric motor promptly and automatically varies to adapt the closing cycle of the preset pin valve 5, as a function of the observed surrounding conditions (e.g. pressure). At the end of the cycle, the pin valve 5 should close the gate thus guaranteeing the absence of seepage.

For this purpose, the invention provides for applying in the last section of the pin valve closing stroke a torque value preset in the electronic control unit as a function of the process conditions (for example material, pressure) which allows obtained a "forced" mechanical closing of the gate 4 and guarantee of absence of seepage.

Figure 6:
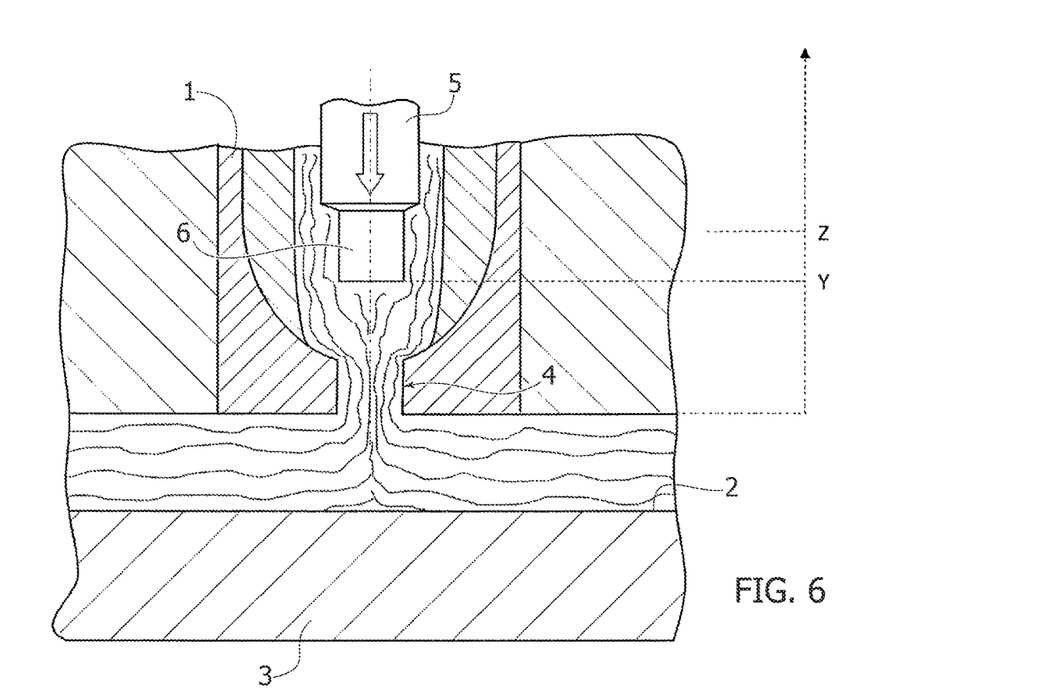
Figure 7:
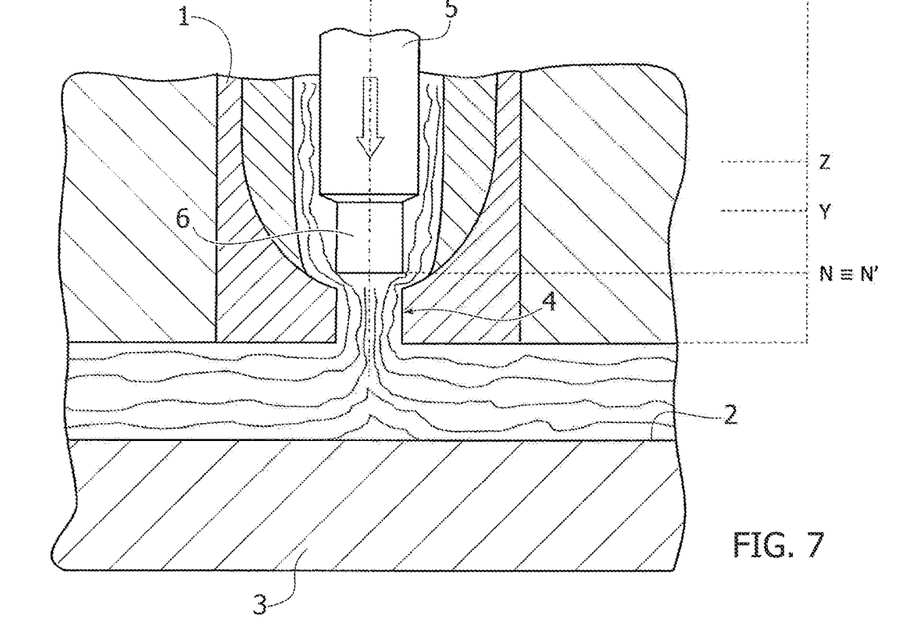
Figure 8:
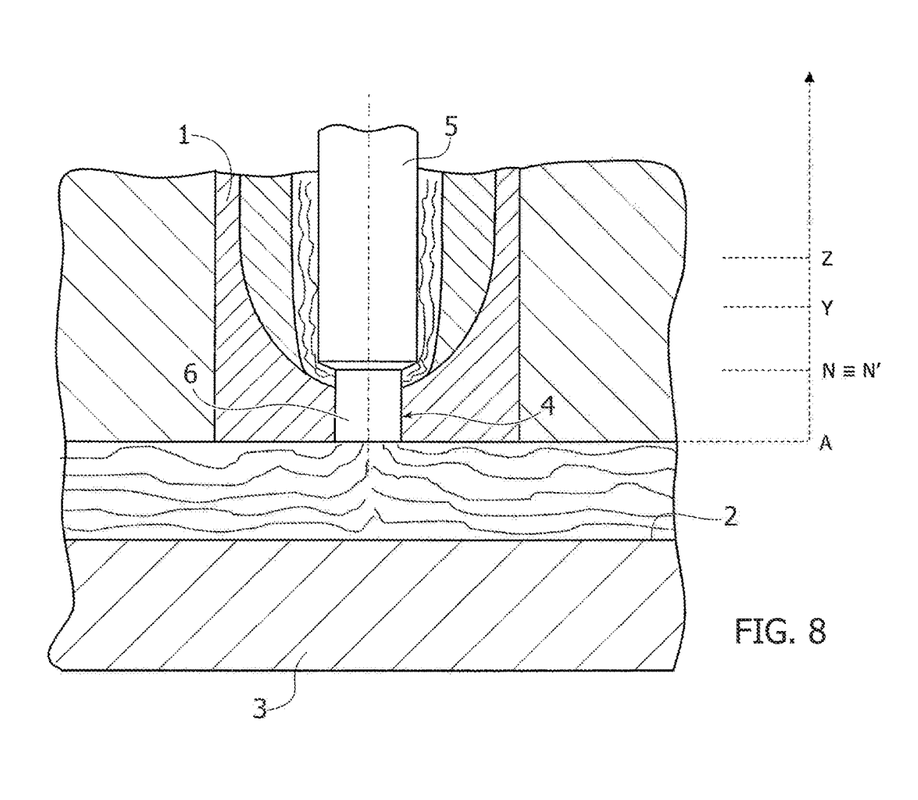

The closing cycle according to the invention is carried out as follows:

from the maximum opening position Z, the pin valve 5 is moved downstream towards the gate 4, passing through one or more intermediate positions Y, X, W, etc. (FIG. 6). The closing speed profile observable for each of the single sections Z-Y, Y-X, X-W etc. possibly present, may be variously shaped as a function of the cycle set in the electronic control unit (not necessarily constant or monotone decreasing speed, but there could for example be sections at null speed);

the pin valve 5 continues in its downstream travel up to the partial closing position N in proximity of the gate 4 (the distance may for example be 1 mm). Such position is held for a brief period of time preset in the electronic control unit (point N', FIG. 7);

from position N', a torque preset as a function of the process parameters (for example material, pressure) is applied to the pin valve 5, due to which it reaches the fully closed position A of the gate 4, guaranteeing the absence of seepage and completing the packing step (FIG. 8) with suitable safety margin. Typically, the closing speed of the last section shall be relatively slow.

Figure 9:
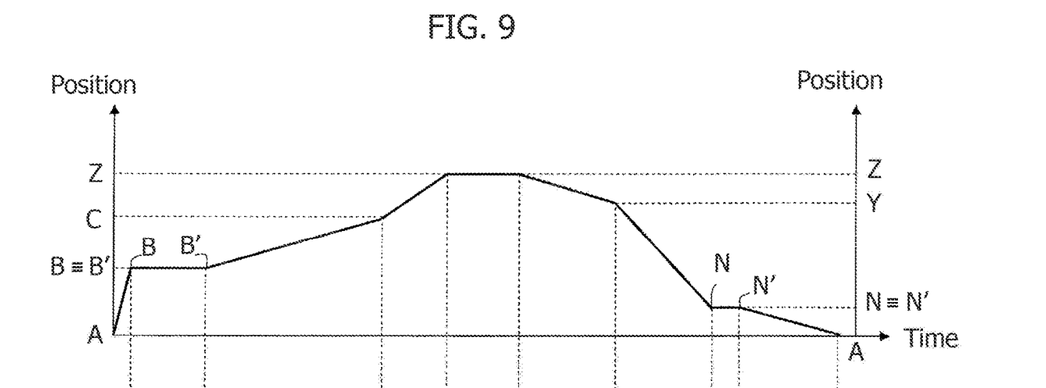
FIG. 9 is a diagram representing the position of the pin valve as a function of time during the steps of the method according to the invention represented in FIGS. 1 to 8.
Figure 10:
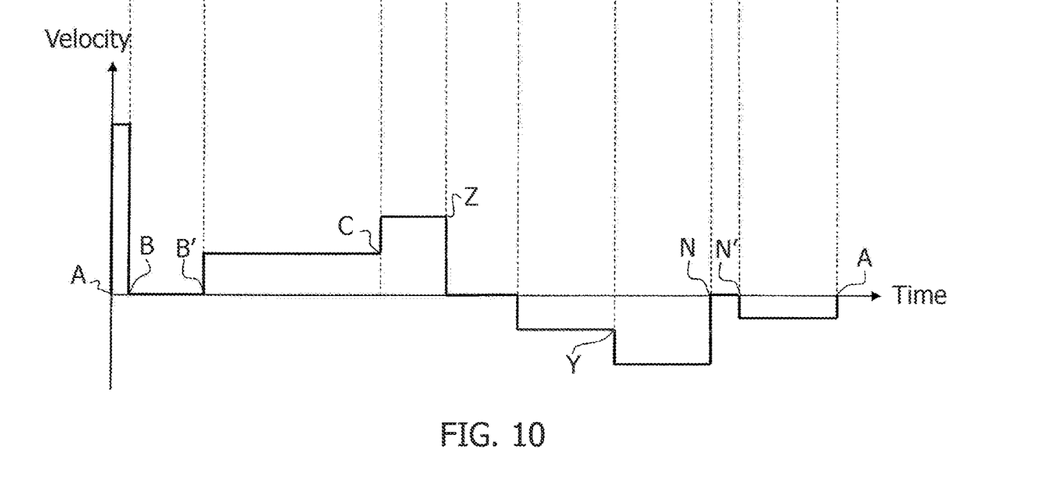
FIG. 10 is a diagram showing the speed of the pin valve as a function of time, correlated to the positions thereof represented in FIG. 9.

FIGS. 9 and 10 respectively show the position and speed profile during a generic full opening and closing cycle of the pin valve 5 actuated according to the method according to the previously described invention, and whose main distinctive characteristics in respect to controlling the position and speed of the pin valve 5 are summarized below:

opening in section A-B at maximum speed from among the speeds observable in the opening step;

holding position B (null speed) up to reaching a preset pressure in the mold cavity (point B'), or up to the end of a preset period of time;

speed profile between B' and Z may vary but always with the opening speed of the single sections lower than that of the initial section A-B;

holding position N in proximity of the gate (null speed) for a preset brief period of time, before applying the preset "forced" closing torque (point N'), established as a function of the process parameters;

closing N'-A due to the application of the preset torque;

movements of the pin valve both for non-continuous, i.e. discontinuous, opening and closing.

Lastly, it should be observed that though the invention has been described with reference to a single injector, it particularly advantageously applies to a cascade or sequential injection with the use of multiple injectors.

The invention claimed is:

1. A method for injection molding of plastic materials into a cavity of a mold by a molding apparatus to create a molded article during an injection cycle comprising at least one injector supplied with fluid plastic material under pressure and including a pin valve displaceable between a fully closed position and a maximum opening position, and vice versa, wherein the pin valve is driven by an electrical actuator in a controlled fashion with respect to its position and speed during displacements thereof, wherein the pin valve during opening displacement from the fully closed position to the maximum opening position is initially moved at a first speed and thereafter at at least one second speed, and wherein said first speed is higher than the or each second speed, and wherein said first speed is a maximum speed of opening displacement of the pin valve sufficient to create a partial vacuum of a distributor of the molding apparatus at a start of the injection cycle thereby improving a surface quality of the molded article.

2. The method according to claim 1, wherein the pin valve is displaced at said first speed from said fully closed position to a partially open position such that a distal end of the pin valve is proximate an entrance to a gate of the mold and partially obstructing flow of the plastic materials into the gate.

3. The method according to claim 2, wherein the pin valve at said partially open position is temporarily stopped for a determined period of time, whereby displacement thereof towards the maximum open position is non-continuous.

4. The method according to claim 3, wherein said determined period of time is pre-set.

5. The method according to claim 3, wherein said determined period of time is established as a function of injection pressure in the mold cavity.

6. The method according to claim 5, wherein said determined period of time depends on reaching a predetermined pressure value.

7. The method according to claim 6, wherein the injection pressure is directly measured in the mold cavity.

8. The method according to claim 6, wherein the injection pressure is indirectly measured through a torque of an electric motor.

9. The method according to claim 4, wherein at an end of said determined period of time, the pin valve is displaced at said at least one second speed up to reaching said maximum opening position.

10. The method according to claim 9, wherein the pin valve is displaced up to reaching said maximum opening position initially at said at least one second speed and subsequently at a third speed higher, equal or lower than the at least one second speed.

11. The method according to claim 9, wherein upon reaching said maximum opening position, the pin valve is stopped for a predetermined period of time.

12. The method according to claim 11, wherein at an end of said predetermined period of time, the pin valve is displaced from the maximum opening position towards the fully closed position while being temporarily stopped at an intermediate partially closed position for a second determined period of time, whereby its closing displacement is non-continuous.

13. The method according to claim 12, wherein said second determined period of time is pre-set.

14. The method according to claim 12, wherein at an end of said second determined period of time, a torque is applied to the electrical actuator which is predetermined as a function of process parameters, so as to displace the pin valve from the intermediate partially closed position to the fully closed position.

15. The method according to claim 14, wherein the displacement speed of the pin valve from the intermediate partially closed position to the fully closed position is lower than the displacement speed thereof from the maximum opening position to the intermediate partially closed position.

16. The method according to claim 1, wherein the electrical actuator driving the pin valve is an electric rotary motor.

17. The method according to claim 1, wherein the method is applied to a molding apparatus including a plurality of said injectors operated according to a sequential cycle.

18. The method according to claim 1, wherein said maximum opening position of the pin valve is less than a top dead center position of a stroke thereof.

19. The method according to claim 1, said pin valve has a cylindrical or frusto-conical tip.

* * * * *